(12) United States Patent
Suzuki

(10) Patent No.: US 7,386,004 B2
(45) Date of Patent: Jun. 10, 2008

(54) DIGITAL BROADCAST SYSTEM

(75) Inventor: Akihiro Suzuki, Hyogo (JP)

(73) Assignee: TOA Corporation, Hyogo (JP)

( * ) Notice: Subject to any disclaimer, the term of this patent is extended or adjusted under 35 U.S.C. 154(b) by 351 days.

(21) Appl. No.: 10/510,638

(22) PCT Filed: Apr. 2, 2003

(86) PCT No.: PCT/JP03/04223

§ 371 (c)(1),
(2), (4) Date: Oct. 8, 2004

(87) PCT Pub. No.: WO03/085893

PCT Pub. Date: Oct. 16, 2003

(65) Prior Publication Data

US 2005/0129056 A1    Jun. 16, 2005

(30) Foreign Application Priority Data

Apr. 9, 2002    (JP) .............................. 2002-106735

(51) Int. Cl.
*G06F 17/00*    (2006.01)
*G06F 15/16*    (2006.01)
*H04H 5/00*    (2006.01)
*H04H 1/00*    (2006.01)
*H04H 7/00*    (2006.01)
*H04J 3/02*    (2006.01)
*H04J 3/26*    (2006.01)
*H04J 1/00*    (2006.01)

(52) U.S. Cl. ............................. 370/462; 381/2; 381/77; 370/432; 370/485; 370/486; 709/217; 709/218; 709/219; 455/3.03; 455/3.06; 700/94

(58) Field of Classification Search .................... 381/2, 381/77; 370/462, 432, 485, 486, 492, 487; 709/217, 218, 219; 700/94; 455/303, 3.06
See application file for complete search history.

(56) References Cited

U.S. PATENT DOCUMENTS 5,394,397 A * 2/1995 Yanagi et al. ............... 370/390

FOREIGN PATENT DOCUMENTS

| JP | 02-224446 | 9/1990 |
| JP | 04-343543 | 11/1992 |

OTHER PUBLICATIONS

Applicant's admitted prior art, Figures 6A-6B, p. 1, line 12-p. 4, line 15.*

* cited by examiner

*Primary Examiner*—Vivian Chin
*Assistant Examiner*—Devona E Faulk
(74) *Attorney, Agent, or Firm*—Wenderoth, Lind & Ponack, L.L.P.

(57) ABSTRACT

A broadcasting system which can monitor all input devices for their operating conditions, the broadcasting system includes input devices $1_1$-$1_M$ for receiving sound, output devices $3_1$-$3_N$ for broadcasting sound, and a controller 4. These features are interconnected through a network 2. In response to a broadcasting request from an arbitrary input device, the controller 4 delivers routing data indicative of a combination of the input device, which has made the broadcasting request, with an output device which should broadcast the sound from the input device to all the input devices $1_1$-$1_M$. The routing data includes priority data indicative of a priority thereof, so that a display unit of each input device makes a display based on the priority data included in the routing data when it receives the routing data from the controller 4.

5 Claims, 5 Drawing Sheets

|  | OUTPUT 21 | OUTPUT 22 | OUTPUT 23 | OUTPUT 24 |
|---|---|---|---|---|
| INPUT 11 | ● | ● |  |  |
| INPUT 12 |  |  |  |  |
| INPUT 13 |  |  | ● |  |
| INPUT 14 |  |  |  | ● |

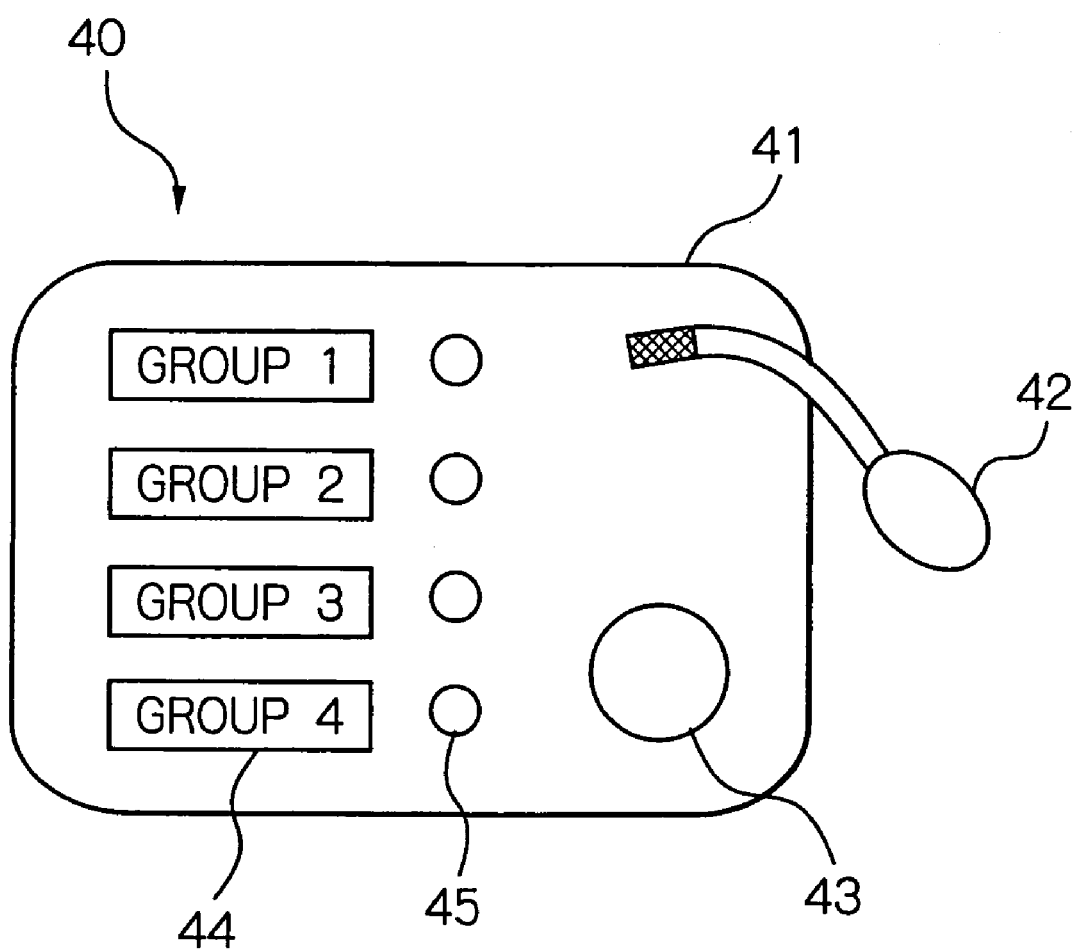

US 7,386,004 B2

DIGITAL BROADCAST SYSTEM

BACKGROUND OF THE INVENTION

1. Technical Field

The present invention relates to a digital broadcasting system which has input devices and output devices connected in a network form, and more particularly, to a broadcasting system which can monitor the system for operating conditions.

2. Description of Related Art

FIG. 6A generally illustrates a conventional broadcasting apparatus. In this broadcasting apparatus, a plurality of, for example, four input devices 11-14 are connected to a plurality of, for example, four output devices 21-24 through a controller 30 called a "matrix controller." Here, the input device refers to an arbitrary audio signal feeding device including a sound source device such as a CD player, a cassette deck, an audio file device and the like, and a microphone terminal, while the output device refers to an audio output device including an amplifier which has a speaker connected to the output side thereof. In a building and the like, the input devices 11-14 and output devices 21-24 are installed in each floor, a management room, or the like.

The controller 30 controls which of the input devices 11-14 inputs sound and delivers the sound to which of the output devices 21-24. For implementing this control, the controller 30 contains a table which represents the relationships between the input devices 11-14 and output devices 21-24 in a matrix form, and stores a plurality of destinations in groups. An example of this table is shown in FIG. 6B. A black circle in the table indicates which of the output devices generates sound delivered from which of the input devices. For example, sound delivered from the input device 11 is output from the output devices 21 and 22, while sound delivered from the input device 12 is not output from any output device. In this event, the output devices 21 and 22 are registered as Group 1, so that the controller 30 selects Group 1 when it receives sound, for example, from the input device 11, thereby causing the output devices 21, 22 to output the sound from the Input device 11. In this way, the controller 30 stores in a one-to-one correspondence the relationships between input devices and groups of output devices which output sound from an associated input device, and is responsive to a request from an input device to instruct output devices registered as included in a group corresponding to the input device to output sound from the input device.

When priorities are set to broadcast contents, even if a certain program is on air, this program is switched to a program with a higher priority when the higher priority program is started. A program with a lower priority may be, for example, a BGM (background music) program, while a calling program, for example, is set a higher priority. While such priorities may be set for each input device, an input device may be provided with a function of selecting a priority in accordance with broadcast contents.

As described above, it is the controller 30 that specifies a destination and a group, but alternatively, the input devices 11-14 may be each provided with a controller for specifying an output device which is the destination. FIG. 7 illustrates the appearance of an input device which contains such a controller. In FIG. 7, an input device 40 comprises a microphone 42 implanted on a housing 41; and a broadcasting switch 43, group selection switches 44, and indicators 45 arranged in the housing 41. The broadcasting switch 43 is a switch for indicating the start and end of broadcasting. The group selection switches 44 are associated with respective groups, so that a switch corresponding to a group which should deliver input sound is depressed for broadcasting. As one of the group selection switches 44 is depressed, an indicator 45 associated therewith is lit to indicate a group which is currently on air. The controller in FIG. 7 is generally used to specify and start a desired program, and a lit one of indicators 45 permits the operator to recognize of which of the groups a currently broadcast program is associated with.

As described above, the controller 30 illustrated in FIG. 6A simply controls the relationships between input devices and output devices in accordance with a matrix table, and the controller 40 in FIG. 7 is similar in simply selecting a destination and indicating a group currently on air. In other words, the input devices 11-14 simply deliver an audio signal to an output device specified thereby or by the controller 30. In a modification to the foregoing, a request may be made from an output device to an input device, such that the input device delivers an audio signal in response to the request. However, in any case, the conventional broadcasting apparatus fails to notify the user of the priority of the broadcasting, specifically, which has a higher priority, a currently broadcast program or a program to be broadcast by the user from now on, thus giving rise to a problem that the user cannot know whether or not his program can be broadcast.

SUMMARY OF THE INVENTION

The present invention has been proposed to solve the problems of the conventional broadcasting apparatus as described above, and it is an object of the invention to provide a broadcasting system which is capable of monitoring all input devices for their operating conditions.

To achieve the above object, the present invention provides a broadcasting system having at least one input device for receiving sound, at least one output device for broadcasting the sound, and a controller interconnected through a network, the broadcasting system characterized in that:

the controller, in response to a broadcasting request from an arbitrary one of the input devices, delivers routing data indicative of a combination of the input device which has made the broadcasting request with the output device which should broadcast the sound from the input device to all of the input devices.

According to one embodiment of the present invention, the controller may comprise a broadcasting pattern table which records a plurality of patterns indicative of combinations of source input devices with destination output devices, wherein the controller may force the input devices to register the plurality of broadcasting patterns when the input devices are initially set.

Each of the input devices may comprise a storing means for registering the plurality of broadcasting patterns.

The input device may comprise broadcasting pattern selection switches for selecting one of the plurality of broadcasting patterns, and display units corresponding one-to-one to the broadcasting pattern selection switches.

The routing data may include priority data indicative of a priority thereof, wherein the display unit of each input device, upon receipt of the routing data from the controller, may make a display based on the priority data included in the routing data.

The input device may comprise comparing means operative when the routing data is received for comparing the routing data with the plurality of broadcasting patterns, wherein the input device may display the result of the comparison made by the comparing means on the display unit.

The above and other objects and advantages of the present invention will be more clearly understood from detailed description of the invention when read with reference to the accompanying drawings.

BRIEF DESCRIPTION OF THE DRAWINGS

FIG. 7 is a diagram illustrating an exemplary specific configuration of conventional input devices.

DETAILED DESCRIPTION OF THE INVENTION

Figure 1:
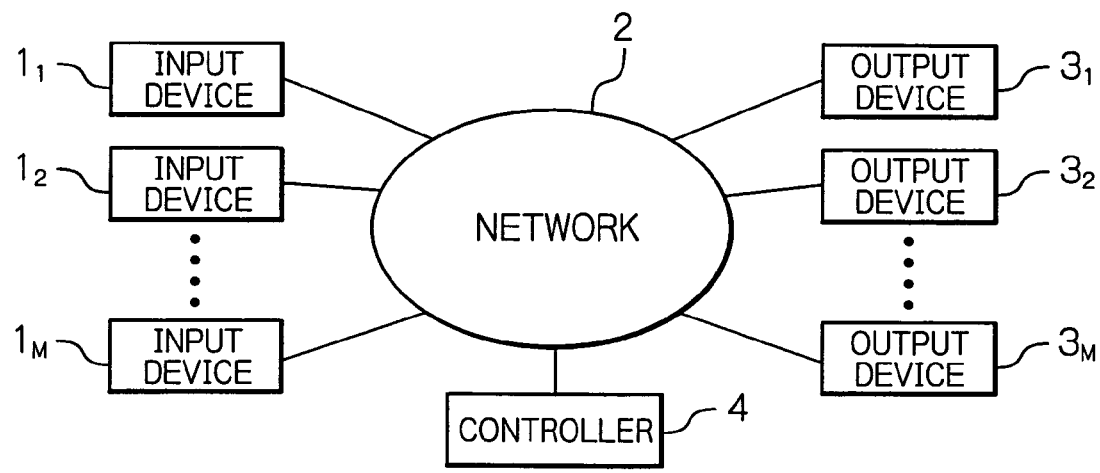
FIG. 1 is a diagram generally illustrating the configuration of one embodiment of a broadcasting system according to the present invention.

In the following, one embodiment of a broadcasting system according to the present invention will be described with reference to FIGS. 1 to 5. FIG. 1 is a diagram generally illustrating the whole configuration of one embodiment of the broadcasting system according to the present invention, where a plurality of input devices $1_1, 1_2, \ldots, 1_M$ are connected to a plurality of output devices $3_1, 3_2, \ldots, 3_N$ through a communication network 2, and a controller 4 is connected to the communication network 2.

Figures 6A, 6B:
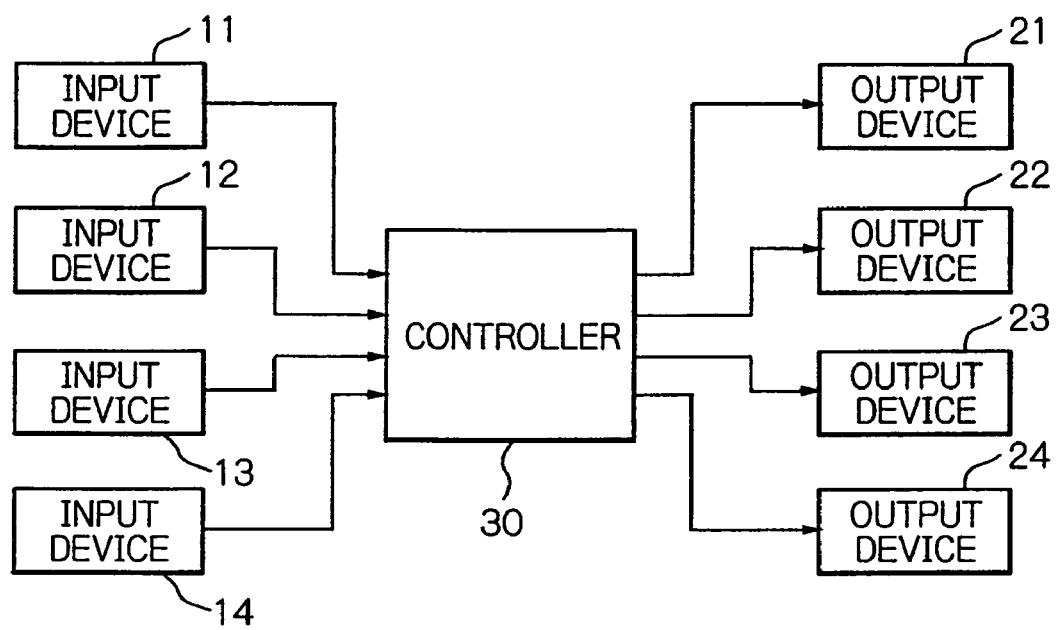
FIG. 6A is a diagram generally illustrating the configuration of a conventional broadcasting apparatus.
FIG. 6B is a table showing exemplary combinations of input devices with output devices.

Each of the input devices $1_1, 1_2, \ldots, 1_M$ has an operation panel which is provided with a plurality of broadcasting pattern selection switches (not shown) for selecting a desired combination from possible broadcasting patterns which can be provided by all the input devices, i.e., from all possible combinations of input devices, which are sources, with output devices which are destinations; and a display unit (not shown) for indicating which broadcasting pattern is in operation, together with a priority. Each of the broadcasting pattern selection switches is assigned a pattern number, similar to the group selection switches in FIG. 7. The broadcasting pattern selection switches and display unit will be described again in connection with FIG. 4. The output devices $3_1-3_N$ may be the same as the output devices 21-24 in FIG. 6A.

The communication network 2 is, for example, Ethernet which is used in general computer networks. An audio signal applied to any of the input devices $1_1-1_M$ is converted into digital data and divided into packets in the input device, and broadcast from a predetermined output device $3_1, 3_2, \ldots,$ or $3_N$, which should receive the audio signal from the input device, through the communication network 2. When the packets are sent from any of the input devices $1_1-1_M$, information for identifying a destination output device $3_1, 3_2, \ldots,$ or $3_N$, for example, an IP address is added to each packet as header information. The output device assembles the packets sent thereto in order to restore the original digital data which is converted to an analog form for reproducing the audio signal. Such real time audio communication processing performed between the input devices $1_1-1_M$ and output devices $3_1-3_N$ is known as streaming.

As previously described, conventionally, sound is transmitted to an output device specified by an input device, or a request is sent from an output device to an input device, and the input device sends the sound in response. The simple delivery of sound from an input device does not allow the user to know which program is currently broadcast. To eliminate this disadvantage, in the broadcasting system of FIG. 1, the controller 4 conducts a routing control.

Figure 2:
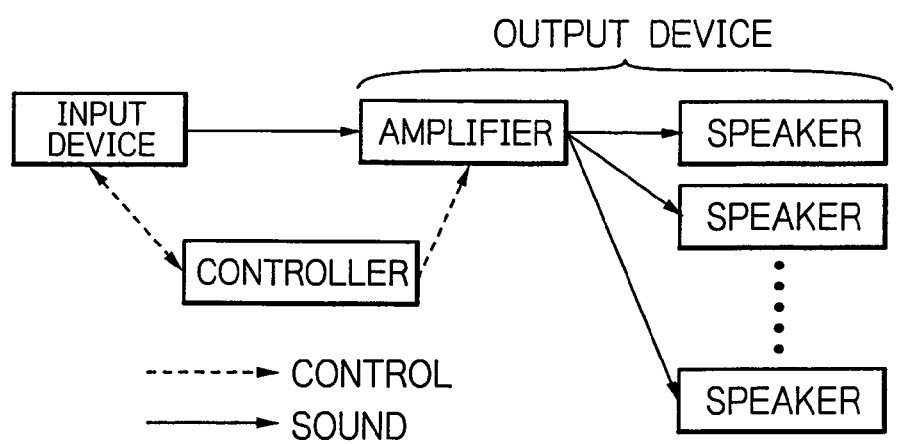
FIG. 2 is a diagram for outlining the control conducted by a controller in FIG. 1.

To implement the routing control, the controller 4 contains a broadcasting pattern table which records broadcasting patterns that represent combinations of input devices with output devices which should broadcast sound from the respective input devices, and priorities given to the combinations. Thus, upon receipt of a broadcasting request from any of the input devices $1_1, 1_2, \ldots, 1_M$, the controller 4 conducts the routing control which involves assigning one or a plurality of predetermined output devices $3_1, 3_2, \ldots,$ or $3_N$ which should broadcast the sound from the input device, which has requested the broadcasting, with reference to the broadcasting pattern table, and bringing the assigned output device(s) into an operative state. Simultaneously, the controller 4 issues routing data, i.e., data indicative of a combination of the source with the destination, assigned by the controller 4 at that time, to all the input devices $1_1-1_M$. The input device which has made the broadcasting request executes the broadcasting based on the received routing data. This procedure is schematically illustrated in FIG. 2, wherein a double-head dotted-line arrow indicates that signal is communicated between an input device and the controller; a single-head dotted-line arrow indicates that an output device is controlled by the controller; and a solid-line arrow indicates that sound from the input device is amplified by an amplifier of the output device and then broadcast from speakers.

The controller 4 sends the routing data to all the input devices $1_1-1_M$, to enable the broadcasting system of FIG. 1 to set priorities to the broadcasting for conducting a priority-based control and to indicate an operating condition of the system and the priority in each of the input devices $1_1-1_M$. In this way, the respective input devices can broadcast in accordance with their priorities.

Figure 3:
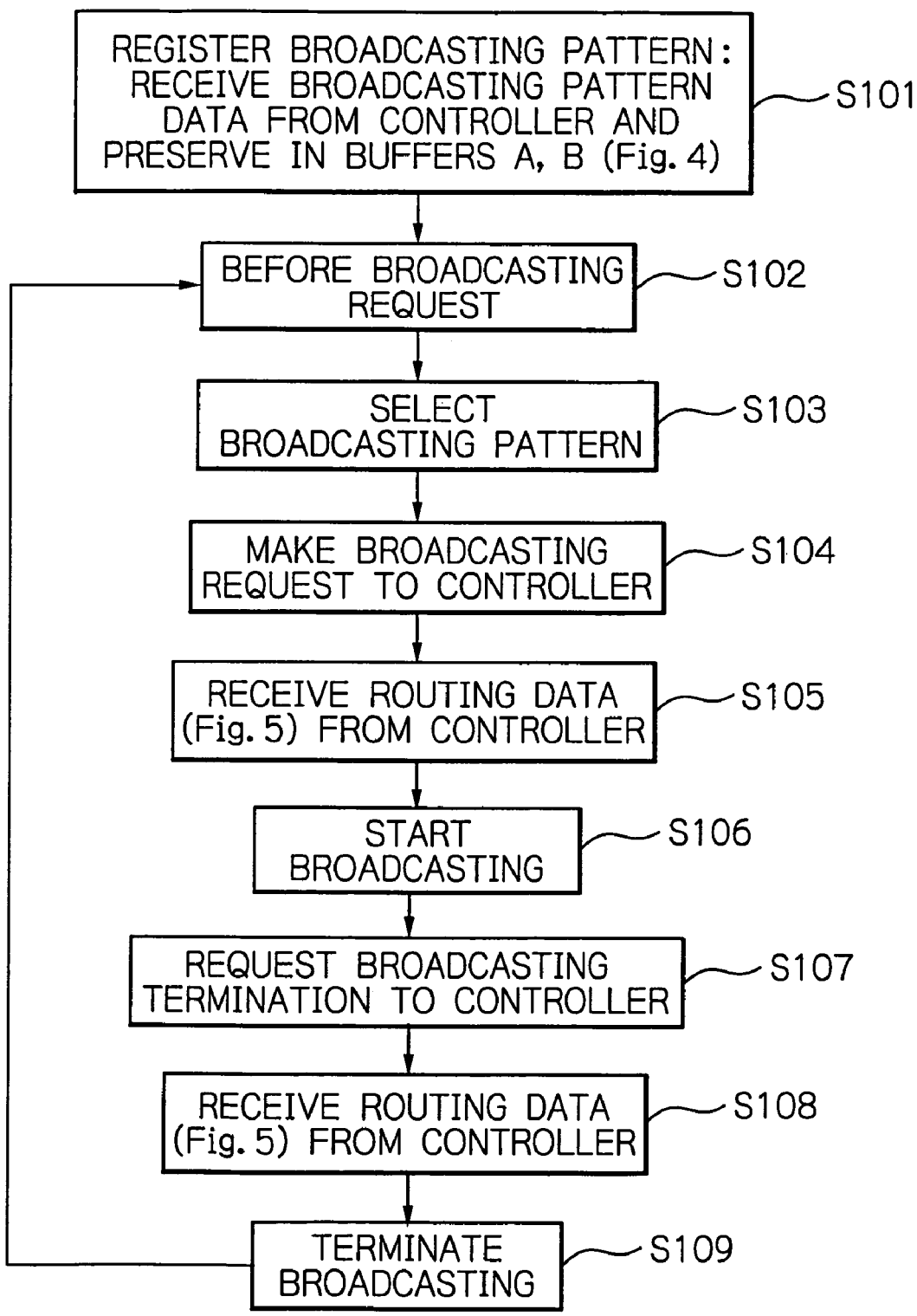
FIG. 3 is a flow diagram illustrating the operation performed by an input device in FIG. 1.

FIG. 3 is a flow diagram for explaining the operation of an arbitrary input device $1_1, 1_2, \ldots,$ or $1_M$. In FIG. 3, the input device registers a broadcasting pattern at step S101. Specifically, the input device receives broadcasting pattern data including the routing data from the controller 4 in the event of initial settings such as power-on, and preserves the received broadcasting pattern data in a buffer. This buffer comprises a broadcasting pattern data buffer (buffer A) and a routing data buffer (buffer B).

Figure 4:
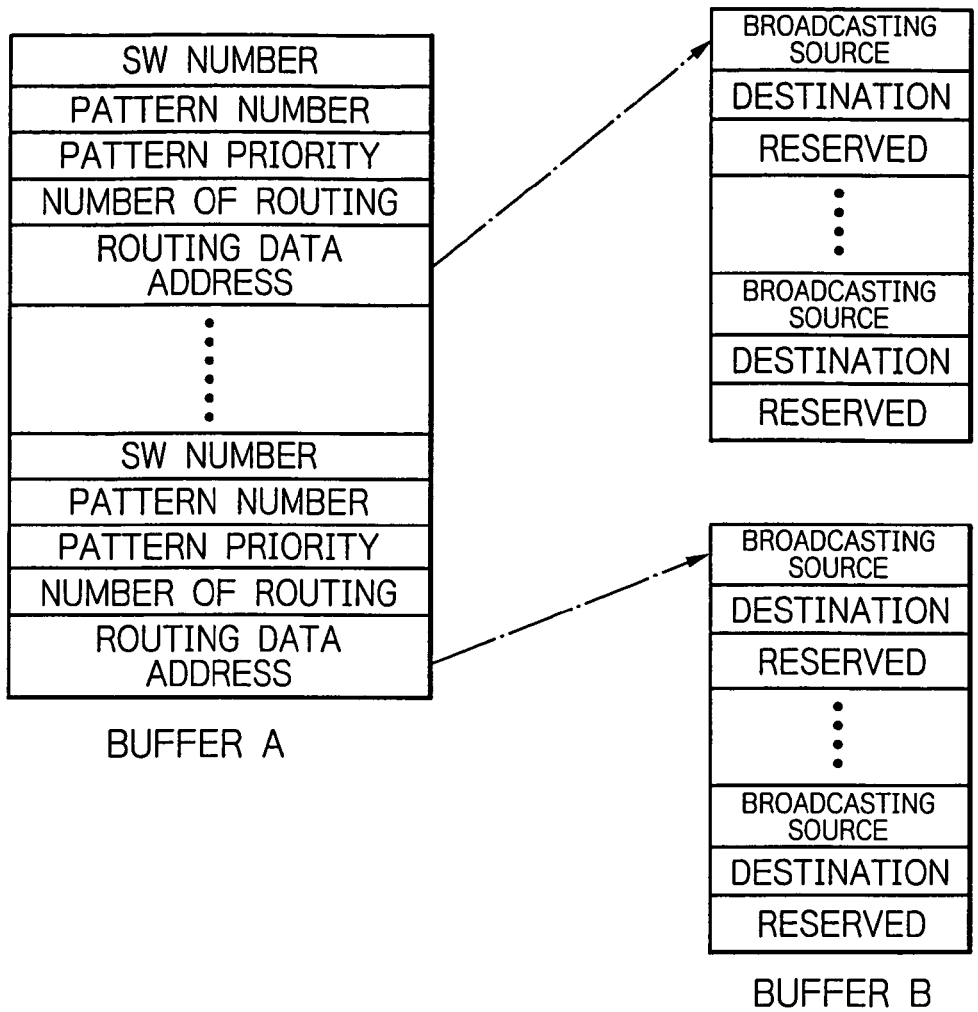
FIG. 4 is a diagram showing exemplary broadcasting pattern data delivered from the controller at step S101 in FIG. 3.

At step S101, the controller 4 sends the broadcasting pattern data respectively corresponding to all previously set broadcasting patterns to the input device $1_1, 1_2, \ldots,$ or $1_M$ which are initially set. FIG. 4 shows an example of data preserved in the buffer A and buffer B of an arbitrary input device. In this example, each broadcasting data includes an SW number, a pattern number, a pattern priority, the number of routings, a routing data address, a source, and a destination, wherein the SW number, pattern number, pattern priority, number of routings, and routing data address are preserved in the buffer A, while the routing data indicative of the source and destination is preserved in the buffer B.

Describing items included in each broadcasting pattern data, the pattern number is a number unique to each broadcasting pattern data for use in identifying a broadcasting pattern. The SW number corresponds to the pattern number, and indicates a number assigned to a broadcasting pattern selection switch provided in each of the input devices $1_1$-$1_M$. The pattern priority indicates a priority given to a broadcasting pattern, by which priorities are set to all broadcasting patterns. The number of routings indicates the number of combinations of sources with destinations, included in a single broadcasting pattern. The routing data address indicates the start address of a storage area in the buffer B for preserving the routing data corresponding to the broadcasting pattern data. Therefore, the buffer B preserves a number of combinations of sources with destinations as much as the number of routings.

Turning back to FIG. 3, after the broadcasting pattern has been registered at step S101, the input device enters a broadcasting enabled condition, and awaits prior to making a broadcasting request at step S102. Then, when the broadcasting is started from the input device, any of the broadcasting pattern selection switches is depressed to select one broadcasting pattern (step S103), and a broadcasting request signal including a pattern signal indicative of the selected broadcasting pattern is sent to the controller 4 (step S104).

Figure 5:
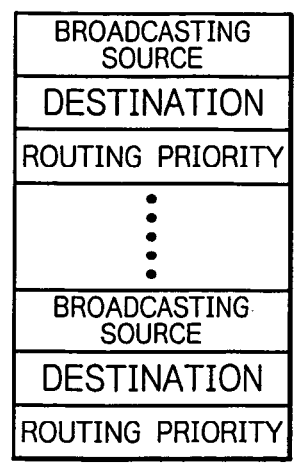
FIG. 5 is a diagram showing exemplary routing data received by an input device at step S105 in FIG. 3.

In response to the broadcasting request signal, the controller 4 performs the routing processing based on the pattern signal, and sends routing data to all the input devices, including the input device which has requested the broadcasting, and to all output devices which should broadcast sound of the input device which has requested the broadcasting. As shown in FIG. 5, the routing data includes a number of data, each comprised of the broadcasting source, destination and routing priority as much as the number of routings for the broadcasting pattern selected by the input device. Upon receipt of the routing data at step S105, the input device which has requested the broadcasting starts broadcasting at step S106, packetizes the sound, and delivers the packetized sound to an output device identified by the received routing data.

When the input device terminates the broadcasting, the input device delivers a broadcasting termination request signal to the controller 4 at step S107. In response, the controller 4 again sends routing data at step S108, and the input device terminates the broadcasting when it receives the routing data, and waits for the next broadcasting (step S109).

As described above, the controller 4, in response to a broadcasting request from one input device, delivers the routing data to all the input devices $1_1$-$1_M$ and to an output device which should broadcast sound from the input device which has made the broadcasting request. In other words, the reception of the routing data at step S105 in FIG. 3 is performed in all the input devices $1_1$-$1_M$. Then, upon receipt of the routing data from the controller 4, each input device $1_1$, $1_2$, . . . or $1_M$ fully compares routing data preserved in its buffer B with the routing data received from the controller 4 to determine whether or not there is the same destination. In other words, the input device determines whether the destinations in the received routing data fully or partially match destinations registered in the associated broadcasting pattern selection switch, or do not match the destinations. Then, the input device operates a display unit in accordance with the result of the comparison. For example, when the input device receives routing data with pattern number 2, the input device operates a display unit associated with a broadcasting pattern selection switch related to the broadcasting pattern corresponding to the pattern number 2. In this way, the input device can display in real time the broadcasting conditions established by all the input devices including itself, as well as know whether the priority of a program broadcast at that time is higher or lower than that of a program broadcast by the input device itself.

Specifically, the display unit provided on the operation panel of each input device $1_1$, $1_2$, . . . or $1_M$ is comprised of indicator lamps "on air" indicating that a program provided by a source is being broadcast and received at all the destinations; "partially on air" indicating that the program provided by the source is broadcast and received by some of the destinations; and "not broadcasted" indicating that the program provided by the source is not broadcast, and indicator lamps indicating that the priority is "higher" than its own; "the same" as its own; and "lower" than its own. The input device can display the broadcasting conditions using the states of these indicator lamps (lit, unlit, flashed, and the like) and changes in display colors of the indicator lamps.

While one embodiment of the broadcasting system according to the present invention has been described above, the present invention is not limited to this embodiment. For example, while the routing data of the broadcasting pattern data has been described as stored in a different buffer as shown in FIG. 4, a single buffer may be used by recording the routing data in the area of the routing data address instead thereof. Also, the display unit of each input device may provide graphical displays using an LCD panel, a display, or the like.

As will be understood from one embodiment of the broadcasting system according to the present invention described in detail, since the routing data sent from the controller to an input device which has made a broadcasting request is delivered to all other input devices so that each input device holds the routing data, the present invention provides an appreciable advantage in that each input device can monitor the entire system for broadcasting conditions without additionally using a signal for displaying operating conditions of the input devices.

The invention claimed is:

1. A broadcasting system having a plurality of input devices for receiving sound, a plurality of output devices for broadcasting the sound, and a controller interconnected with said input and output devices through a network, said broadcasting system characterized in that:

said controller, in response to a broadcasting request from an arbitrary one of said input devices, delivers routing data to all of said input devices indicative of a combination of said one input device, which has made the broadcasting request, and said output device or devices which should broadcast the sound from said one input device, wherein said controller comprises a broadcasting pattern table which records a plurality of broadcasting patterns indicative of combinations of source input devices with destination output devices, wherein said controller sends said plurality of broadcasting patterns to said input devices and said input devices register the plurality of broadcasting patterns when said input devices are initially set.

2. A broadcasting system according to claim 1, wherein each of said input devices comprises a storing means for registering the plurality of broadcasting patterns.

3. A broadcasting system according to claim 2, wherein each of said input devices comprises broadcasting pattern selection switches for selecting one of the plurality of broadcasting patterns, and display units corresponding one-to-one to said broadcasting pattern selection switches.

4. A broadcasting system according to claim 3,
wherein said routing data includes priority data indicative of a priority thereof, and
wherein said display unit of each said input devices, upon receipt of the routing data from said controller, makes a display based on the priority data included in the routing data.

5. A broadcasting system according to claim 3,
wherein each of said input devices comprises comparing means operative when the routing data is received for comparing the routing data with the plurality of broadcasting patterns,
wherein each of said input devices displays the result of the comparison made by said comparing means on said display unit.

* * * * *